United States Patent
Wolter et al.

(10) Patent No.: US 7,478,802 B2
(45) Date of Patent: Jan. 20, 2009

(54) PIVOTING BEARING

(75) Inventors: Stefan Wolter, Lembruch (DE); Werner Schmudde, Bersenbrück (DE); Reinhard Richter, Bohmte (DE); Reinhard Buhl, Bohmte (DE); Holger Bublies, Osnabrück (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 706 days.

(21) Appl. No.: 11/106,063

(22) Filed: Apr. 14, 2005

(65) Prior Publication Data

US 2005/0179182 A1 Aug. 18, 2005

Related U.S. Application Data

(63) Continuation of application No. PCT/DE03/04132, filed on Dec. 15, 2003.

(30) Foreign Application Priority Data

Dec. 16, 2002 (DE) .............................. 102 58 987

(51) Int. Cl.
*F16F 7/00* (2006.01)
(52) U.S. Cl. ................................ 267/141.2; 267/141.3
(58) Field of Classification Search ............ 267/140.12, 267/141.2, 141.3; 384/202, 203, 206, 209, 384/210
See application file for complete search history.

(56) References Cited

U.S. PATENT DOCUMENTS

| 3,700,295 | A * | 10/1972 | Butzow et al. ............... 384/210 |
| 6,231,264 | B1 * | 5/2001 | McLaughlin et al. .......... 403/76 |
| 2003/0089546 | A1 | 5/2003 | Bjorkgard | |

FOREIGN PATENT DOCUMENTS

| DE | 24 34 501 A1 | 1/1976 |
| EP | 544112 * | 7/1993 |
| EP | 0 819 556 A2 | 1/1998 |
| JP | 2002-188619 | 7/2002 |
| WO | WO 02/06067 A1 | 1/2002 |

* cited by examiner

*Primary Examiner*—Bradley T King
(74) *Attorney, Agent, or Firm*—McGlew & Tuttle, P.C.

(57) ABSTRACT

A pivoting bearing for chassis components of motor vehicles has a tubular joint housing (8), which forms a cylindrical interior space and in which a metallic internal part (1) and an elastomer body (5) are accommodated. The elastomer body (5) is axially pretensioned in the axial longitudinal direction via the intermediary of stop rings (6, 7), which are connected with the elastomer body and cooperate with corresponding projections (10), which project into the interior space of the joint housing (8). At least one of the projections is formed by a spring lock washer (11), which is inserted into a radial depression (12) of the interior space of the joint housing (8) and is in contact with a recess (14). The recess extends circumferentially radially at the outer edge of the stop ring (6) and is engaged by the spring lock washer (11) in the mounted state of the pivoting bearing.

9 Claims, 2 Drawing Sheets

PIVOTING BEARING

CROSS REFERENCE TO RELATED APPLICATION

This is a continuation of and claims the benefit (35 U.S.C. §120 and 365(c)) of copending International Application PCT/DE 2003/004132 filed Dec. 15, 2003, which designated inter alia the United States and which claims the priority of German Application DE 102 58 987.9 filed Dec. 16, 2002. The entire contents of each application is hereby incorporated by reference in its entirety.

FIELD OF THE INVENTION

The present invention pertains to a pivoting bearing preferably for chassis components of motor vehicles with a tubular joint housing, which forms a cylindrical interior space and in which a metallic internal part and an elastomer body, which surrounds the internal part and is arranged adheringly thereon, are accommodated, wherein the elastomer body is axially pretensioned in the axial longitudinal direction of the pivoting bearing via the intermediary of stop rings, which are connected with the elastomer body in a firmly adhering manner, and are designed as bearing shells and cooperate with corresponding projections of the housing, which project into the interior space of the joint housing.

BACKGROUND OF THE INVENTION

The pivoting bearings are used preferably in chassis modules for utility vehicles. Such bearings have proved to be successful, in principle, in the state of the art. Radial, axial and cardanic movements of the internal part in relation to the housing are brought about under normal conditions by molecular deformations of the elastomer body, which is under axial pretension. The pretension is brought about during mounting by the internal part with the elastomer body arranged adheringly thereon and with bearing shells, which firmly adhere thereto, are arranged in the axial direction and are designed as stop rings, being inserted into the housing, and by the elastomer body being subsequently compressed, preferably by a press, via the stop rings to a defined size and by the spring lock washer being at the same time inserted into the radial depression of the interior space of the joint housing, wherein the opposite stop rings are in contact on a shoulder prepared by turning into the housing, so that the tension of the elastomer body can be released again only slightly at best.

It was found in practice that relative movements may occur between the elastomer body with the stop rings arranged adheringly thereon and the spring lock washer under certain, extreme operating conditions under dynamic load on the pivoting bearing, which may occur during operation of the vehicle. There is a risk in the particular case that the spring lock washer jumps out of the radial depression of the joint housing, into which it is inserted, as a result of which the pivoting bearing abruptly loses its function.

SUMMARY OF THE INVENTION

The object of the present invention is therefore to improve a pivoting bearing of the type described such that reliable operation of the pivoting bearing is also guaranteed under extreme operating conditions by ensuring that the retaining ring used, which represents an inexpensive and simple pretensioning of the elastomer body of the pivoting bearing, remains in the position once set within the framework of mounting at any time.

According to the present invention a pivoting bearing is provided, preferably for chassis components of motor vehicles. The bearing has a tubular joint housing, which forms a cylindrical interior space and in which a metallic internal part and an elastomer body), which surrounds the said internal part and is arranged adheringly thereon, are accommodated. The elastomer body is axially pretensioned in the axial longitudinal direction of the pivoting bearing via the intermediary of stop rings, which are connected with the elastomer body in a firmly adhering manner. These stop rings are designed as and perform the function of bearing shells and cooperate with the corresponding projections, which project into the interior space of the said joint housing. At least one of the projections is formed by a spring lock washer, which is inserted into a radial depression of the interior space of the joint housing and is in contact by its lateral surface directed toward the center of the interior space with an axial outer side of one of the stop ring. The stop ring of the elastomer body cooperating with the spring lock washer has, on its axial outer side facing the spring lock washer, a recess, which extends radially circumferentially on the outer edge of the stop ring and which is engaged by the spring lock washer in the mounted state of the pivoting bearing.

Due to this combination of features according to the present invention, it can be reliably ruled out that the spring lock washer will jump out of the depression located in the joint housing as a consequence of the radial deformation of the spring lock washer.

Corresponding to an advantageous variant, it is sufficient for the depth of the recess in the axial direction of the pivoting bearing to be about half the thickness of the spring lock washer used.

An exemplary embodiment of the subject of the present invention will be described in greater detail below on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
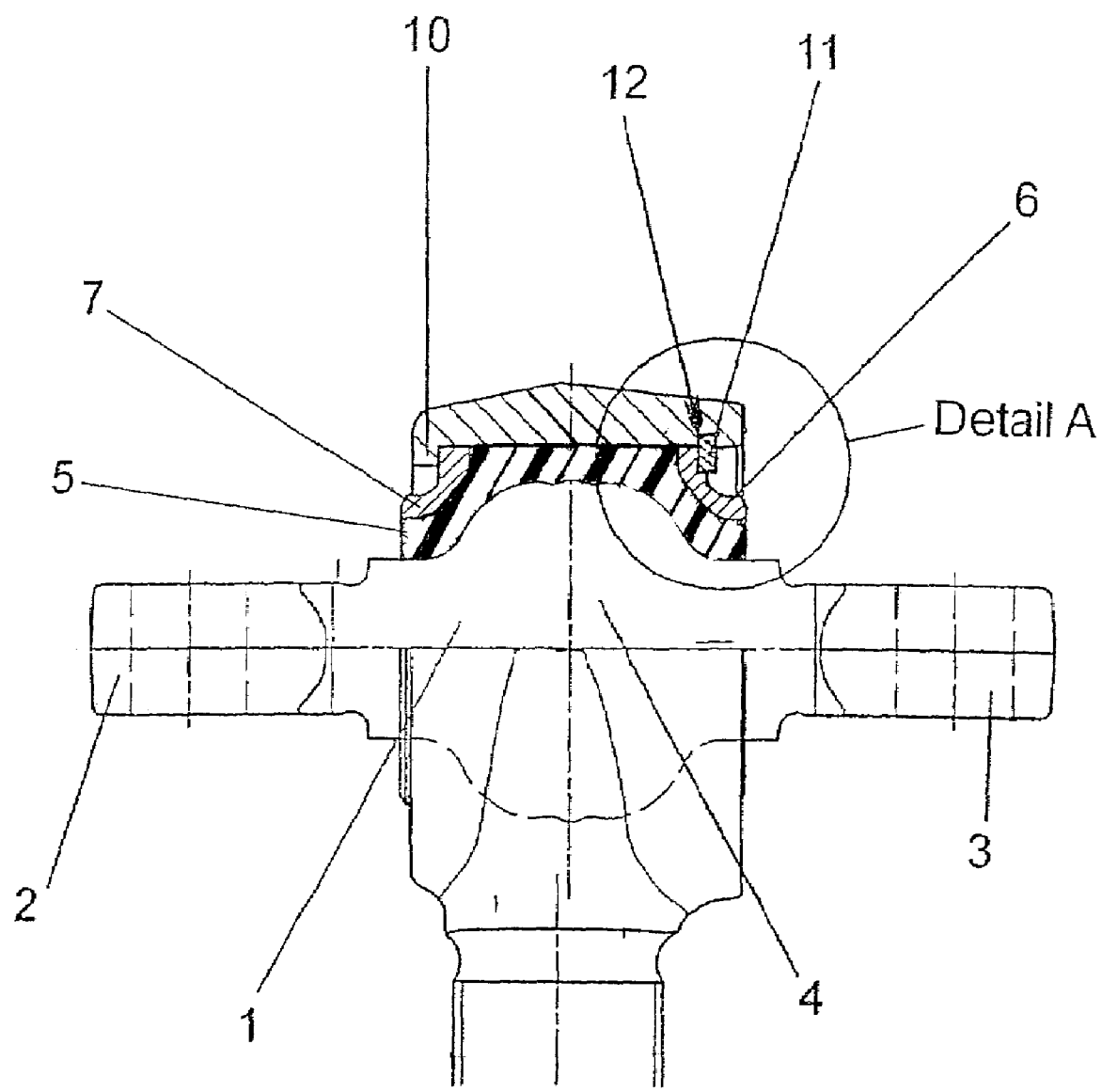
FIG. 1 is a partially cut-away view through a pivoting bearing according to the present invention.

Referring to the drawings in particular, in FIG. 1, the pivoting bearing comprises an internal part 1, which has fastening pins 2 and 3 at both free ends for connection with a motor vehicle part. The central, spherically shaped middle area 4 of the internal part 1 is surrounded by an elastomer body 5, which is adheringly connected with the internal part 1, for example, by a vulcanization process. Stop rings 6 and 7 are arranged on the front sides of the elastomer body 5, which are seen in the axial longitudinal direction of the pivoting bearing and are adheringly connected with the elastomer body. Together with the stop rings 6 and 7, the elastomer body 5 is accommodated in a joint housing 8, which has an essentially tubular shape and forms a cylindrical interior space 9. The cylinder interior space 9 is provided on one side with a circumferential shoulder 10, against which the stop ring 7 is supported. The other stop ring 6 is supported in the mounted state of the pivoting bearing against a spring lock washer 11, which is inserted into a circumferential radial depression 12 of the interior space of the joint housing. The depression is designed as an L-shaped groove. In the unmounted state, the elastomer body 5 has a greater width in the axial longitudinal direction than that provided between the inner side of the shoulder 10 and the inner side of the spring lock washer 11 within the joint housing 8. The elastomer body is therefore compressed during the mounting process in the axial direction to the extent that the spring lock washer 11 can be inserted into the depression 12 provided for this purpose in the cylindrical interior space 9 of the joint housing 8. Repeated release of the tension of the elastomer body 5 is thus ruled out and the elastomer body is thus pretensioned.

Figure 2:
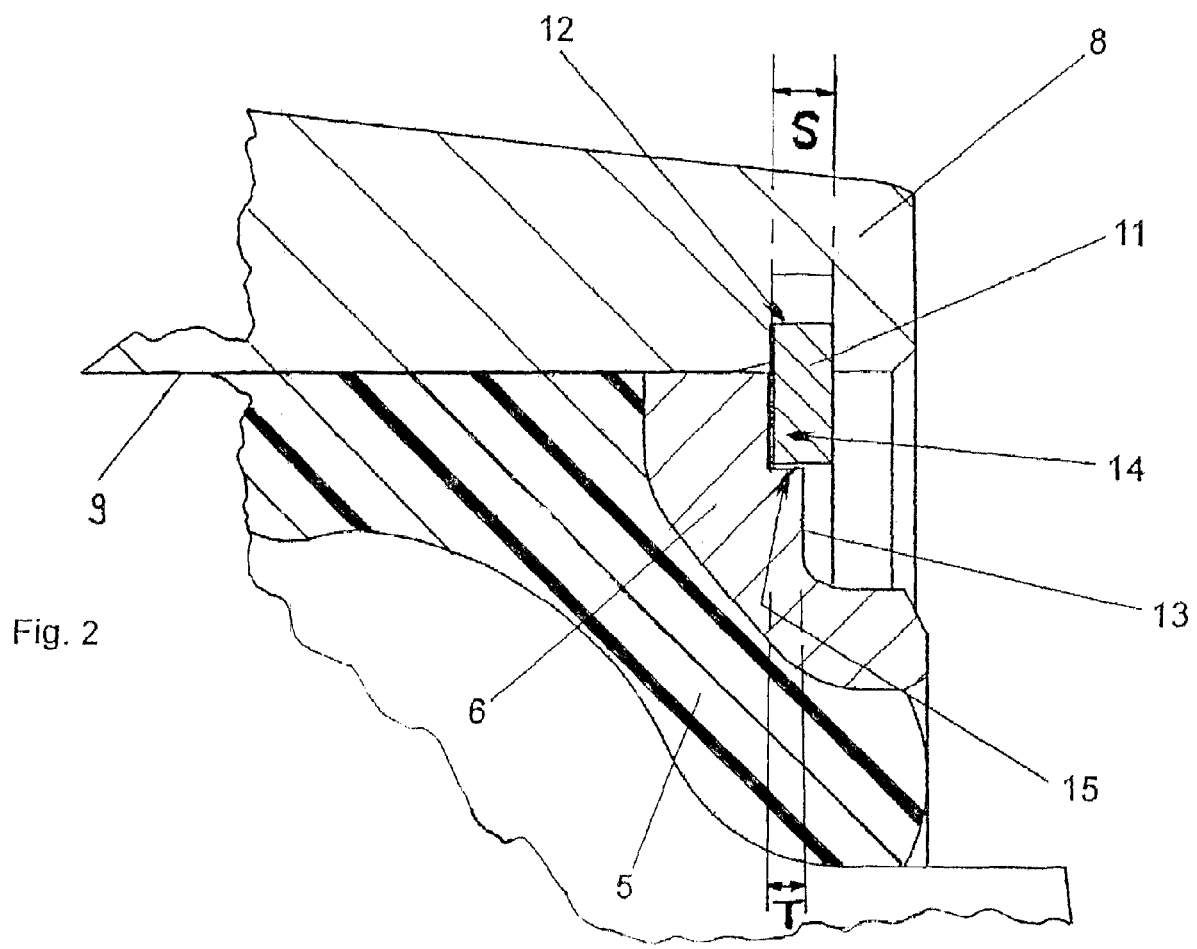
FIG. 2 shows an enlarged view of detail A from FIG. 1.

To guarantee that the spring lock washer 11 always remains in the position shown in FIG. 1 in the depression 12 under all operating conditions, especially also under high dynamic load on the pivoting bearing, the pivoting bearing has according to the present invention the peculiarity shown in FIG. 2 as an enlarged drawing of detail A from FIG. 1.

FIG. 2 shows the area in which the elastomer body with the adjacent stop ring 6 is fastened by the spring lock washer 11, which is accommodated in the recess 12 of the joint housing 8. The technical teaching according to the present invention makes provisions here for the stop ring 6 cooperating with the spring lock washer 11 to have a recess 14 on its axial outer side 13 facing the spring lock washer. This recess is arranged circumferentially on the outer edge of the stop ring 6 and has an essentially rectangular cross section. The diameter of the radial limiting surface 15 is selected according to an aspect of the invention to be such that it is only insignificantly smaller than the smallest internal diameter of the spring lock washer 11.

It can also be determined from the view in FIG. 2 that the dimension T, which designates the depth of the recess 14, is essentially half the thickness S of the spring lock washer 11. The geometric shape and the dimensions of the recess 14 guarantee that after the spring lock washer 11 has been inserted, it is ruled out that it would snap out of the depression 12 as a consequence of dynamic loads.

While a specific embodiment of the invention has been shown and described in detail to illustrate the application of the principles of the invention, it will be understood that the invention may be embodied otherwise without departing from such principles.

What is claimed is:

1. A pivoting bearing, for chassis components of motor vehicles, the bearing comprising:
   a tubular joint housing forming a cylindrical interior space;
   a metallic internal part and an elastomer body accommodated in said interior space, said elastomer body surrounding a portion of said internal part and being arranged adheringly thereon;
   stop rings, said elastomer body being axially pretensioned in the axial longitudinal direction of the pivoting bearing between said stop rings, said stop rings being connected with the elastomer body in a firmly adhering manner, said stop rings forming bearing shell portions; and
   projections projecting into said interior space, wherein at least one of said projections is formed by a spring lock washer inserted into a radial depression of said interior space of said joint housing, said spring lock washer being in contact via a lateral surface thereof directed toward a center of the interior space with an axial outer side of said one of said stop rings cooperating with said spring lock washer, said axial outer side of said stop ring cooperating with the spring lock washer having a recess extending circumferentially radially at the outer edge of the stop ring and having a radial limiting surface with an axial extent overlapping an axial extent of an inner peripheral surface of said spring lock washer, said recess being engaged by the spring lock washer in the mounted state of the pivoting bearing with said spring lock washer extending into said radial depression with a free space between said inner peripheral surface of said spring lock washer and said radial limiting surface being less than a radial depth of said radial depression.

2. A pivoting bearing in accordance with claim 1, wherein a depth of the recess in the axial longitudinal direction of the pivoting bearing is approximately half a thickness of said spring lock washer.

3. A pivoting bearing in accordance with claim 1, wherein said one of said stop rings has a radially extending shank portion and an axially extending shank portion, said recess being formed in said radially extending shank portion and said radial limiting surface is defined by an axially extending shoulder radially spaced from said axially extending shank portion.

4. A pivoting bearing comprising:
   a tubular joint housing forming a cylindrical interior space;
   a metallic internal part;
   an elastomer body accommodated with said metallic internal part in said interior space, said elastomer body surrounding a portion of said internal part and being arranged thereon;
   a first side stop ring;
   a second side stop ring, said elastomer body being axially pretensioned in the axial longitudinal direction of the pivoting bearing by said first side stop ring and second side stop ring connected with the elastomer body in a firmly adhering manner; and
   a spring lock washer inserted into a radial depression of said interior space of said joint housing, said spring lock washer being in contact, via a lateral surface thereof directed toward a center of the interior space, with an axial outer side of said first side stop ring cooperating with said spring lock washer, said axial outer side of said first stop ring having a recess, said first stop ring having a radial limiting surface of said recess with an axial extent overlapping an axial extent of an inner peripheral surface of said spring lock washer, said recess receiving said spring lock washer in the mounted state of the pivoting bearing with said spring lock washer arranged extending into said radial depression a radial engagement length with a free space between said inner peripheral surface of said spring lock washer and said radial limiting surface being less than said radial engagement length.

5. A pivoting bearing in accordance with claim 4, wherein a depth of the recess in an axial longitudinal direction of the pivoting bearing is approximately half a thickness of said spring lock washer.

6. A pivoting bearing in accordance with claim 4, wherein said first stop ring has a radially extending shank portion and an axially extending shank portion, said recess being formed in said radially extending shank portion and said radial limiting surface is defined by an axially extending shoulder radially spaced from said axially extending shank portion and radially spaced from a radially outer end of said radially extending shank portion.

7. A pivoting bearing comprising:

a tubular joint housing with a housing inner surface forming a cylindrical interior space, said housing inner surface having a radial depression extending radially to define a radial dimension and having an axial dimension;

a metallic internal part;

an elastomer body accommodated with said metallic internal part in said interior space, said elastomer body surrounding a portion of said internal part and being arranged thereon;

a first side stop ring connected with the elastomer body in a firmly adhering manner, said first side stop ring having an axial outer side having a radially extending recess with a radial limiting surface extending axially with an axial dimension, and having a radial outer side in contact with said housing inner surface, said recess extending from said radial outer side to said radial limiting surface;

a second side stop ring connected with the elastomer body in a firmly adhering manner, said housing having a projection projecting into said interior space and in contact with said second side stop ring to hold said second side stop ring against movement in a second side axial direction; and a spring lock washer, said radial depression receiving said spring lock washer, said washer having a thickness and an inner peripheral surface and an outer peripheral surface with a distance between said inner peripheral surface and said outer peripheral surface defining a spring washer radial dimension, said spring lock washer having a portion extending out of said radial depression in contact with said radially extending recess with said elastomer body axially precompressed in the axial longitudinal direction of the pivoting bearing between said first side stop ring and said second side stop ring, said axial dimension of said radial limiting surface and said thickness of said spring lock washer being in overlapping axial regions whereby said inner peripheral surface of said spring washer is prevented from moving in an axial direction beyond said radial limiting surface, said spring lock washer radial dimension being greater than a distance of said radial limiting surface to said housing inner surface and greater than said radial dimension of said radial depression.

8. A pivoting bearing in accordance with claim 7, wherein a depth of the recess in an axial longitudinal direction of the pivoting bearing is approximately half said thickness of said spring lock washer.

9. A pivoting bearing in accordance with claim 7, wherein said first stop ring has a radially extending shank portion and an axially extending shank portion, said recess being formed in said radially extending shank portion and said radial limiting surface is defined by an axially extending shoulder radially spaced from said axially extending shank portion.

\* \* \* \* \*